United States Patent Office 3,412,055
Patented Nov. 19, 1968

3,412,055
RESINOUS COATING COMPOSITIONS COMPRISING THE LATENT CURING AGENT PHOSPHORUS TRICHLORIDE
Jerry Norman Koral, Stamford, Conn., assignor to American Cyanamid Company, Stamford, Conn., a corporation of Maine
No Drawing. Filed May 23, 1966, Ser. No. 551,908
10 Claims. (Cl. 260—21)

ABSTRACT OF THE DISCLOSURE

A stable, high gloss imparting low temperature curable coating composition which comprises a resinous component (A) of from about 95 to 60% by weight of:

(1) a curable resinous component which consists of a free hydroxyl function containing resin selected from the group consisting of acrylic resins, vinyl resins, polyester resins and polyepoxide resins, and from 5 to 40% by weight of (2) a cross-linking agent composed of a substantially fully etherified hexamethylol melamine and (B) as a curing agent component from 0.5 to 6% by weight based on the total resin solids of the latent curing catalyst phosphorus trichloride.

---

The present invention relates, in general, to new and improved high gloss coatings and novel compositions for their preparation and use.

From the standpoint of chemical compositions of matter, the invention comprises a resinous composition of (A) a resinous component which is limited only by the requirement that it must contain a free hydroxyl function in either primary, secondary or tertiary relationship thereto (B) a cross-linking agent which comprises a substantially fully etherified hexamethylol melamine having alkoxy methyl groups such as ethoxy, propoxy, and butoxy methyl groups either singularly or in admixture thereof, and (C) from about .5 to about 6% by total weight of the resinous composition of a novel and unique curing catalyst phosphorous trichloride.

The essence of this invention resides in the use of this phosphorus trichloride curing catalyst instead of, for example, a known cure catalyst such as hydrochloric acid. I have found quite unexpectedly, that if one employs the small quantity indicated of phosphorus trichloride as a curing catalyst he obtains a resinous coating composition product which may be cured at quite low cure conditions and (1) may be stored for prolonged periods as a one-package composition of the curing agent in the presence of the resinous component without premature set or reaction, (2) does not cause the flocculation of the pigments therein as demonstrated by the excellent gloss retention of films prepared from aged resin-coating compositions.

It is a principal object of my invention therefore, to disclose and claim a resinous coating composition which comprises a curable resin base made up of one or more resinuous materials having free hydroxyl groups, a cross-linking agent, and a small but effective amount of a new low temperature curing catalyst specifically the compound phosphorus trichloride.

In a use aspect, it is a further object of my invention to disclose the mode of preparation of the improved resinous coating composition as well as their application in areas where the low-temperature cure of resinous coatings is important.

A particular unique feature of my novel coating compositions resides in the capacity they exhibit for low-temperature cure which, in some instances, may be conducted at room temperature or below. In this regard, their primary field of utility will exist in their application as clear lacquers or pigmented paints or gel coats in the form of enamels which are to be cured at around room temperature after being coated onto the surface of the object being coated.

By the terms "free hydroxyl containing resinous component," employed in the description of my improved composition, I intend to generally embrace a large number of materials since a large number of presently known resins have this particular characteristic. However, for the purpose of limiting the description herein to some extent and recognizing that such description is only illustrative of my concept, I particularly intend to disclose the invention with respect to hydroxyl containing acrylic resins such as the acrylic resinous reaction product of butyl acrylate and hydroxyl propyl methacrylate, a resin blend of a polyester resin and an aminoplast resin such as those illustrated in United States Patent No. 2,851,429 to Petropoulos, a polyepoxide resin such as that illustrated in United States Patent No. 3,018,258 to Mier et al. and combinations of any of these. Since these three particular types of resins are the ones most prominent and commercial in the coatings resins field, they have been chosen to illustrate my invention in the several examples. For instance, Example 1 below discloses the formulation, cure and evaluation of a pigmented acrylic resin containing a substantially fully etherified hexamethylol melamine cross-linking agent and my novel curing catalyst. Example 5 discloses the preparation and use of a coating resin of the polyepoxide class with the same cross-linking agent and my curing catalyst also added. Example 7 still further supplies an illustration of a mode of curing a resin such as a polyester alkyd and an aminotriazine cross-linking agent of the type indicated. It, of course, should be understood that innumerable variations can be made on the details of these concrete embodiments without departing from the framework of my basic concept in its broadest manifestation.

For the purposes of definition of terms herein the expression "substantially fully etherified" when and where in this instrument it is employed to define the hexamethylolmelamine cross-linking agent shall refer to and describe that composition which results from the inter-reaction of about 5.0 to 6.0 moles of a suitable alcohol or mixtures thereof with one mole of hexamethylolmelamine monomer.

BACKGROUND OF THE INVENTION

By way of background of the present invention and to enable one to better assess its value, it should be pointed out that for many years it has been desired to obtain a coating composition which was while capable of being cured at low temperatures as low as room temperature within a reasonable time, yet was also capable of being sufficiently shelf stable prior to cure to be admixed prior to shipment to the user. This would require that all components, i.e., the curable resins, the curing catalyst, the cross-linkers and pigment components all could exist together for a reasonable period of time after being admixed. However, while a satisfactory catalyst was found to exist in hydrochloric acid as far as the low-temperature cure aspect was concerned unfortunately, this catalyst was reactive with the alcohol solvent and if admixed prior to use it was not stable.

In this connection, it should be pointed out that, a second problem arose with the use of hydrochloric acid catalysts quite apart from its inability to co-exist without reaction with its alcohol stabilizer. This came in connection with the fact that when HCl was employed as a low-temperature cure catalyst in a system such as a white enamel coating which contains a significant quantity of white pigment a problem of pigment stability was noted. In effect, what happened in the coating composition shortly after it was made up with the HCl catalyst was a flocculation of the pigment which it was impossible to restore to its former state. This would occur with different levels of pigment and acid catalyst content to be sure but the fact it would and could occur rendered the system unreliable as far as the user was concerned and hence, was a great roadblock in the formulation of pigmented coatings.

Based on the above, a problem which hence arose with HCl low temperature induced coatings, was that of the gloss characterized in the finished applied coatings. This gloss while initially satisfactory after a short while in use appeared to diminish greatly with time. This does not appear to be true with coating resins catalyzed by means of my phosphorous trichloride curing catalyst system.

hydrocarbon-alcohol solvent blend. After 24 days of shelf storage no significant deterioration in curing properties as measured by reduced hardness was noted. Also, during shelf storage no increase in viscosity is noted and hence, no condensation can be shown to have occurred. The pigment in the resin coating solution remains finely dispersed, does not appear in any way to be disturbed by the presence of the curing agent either before or following cure. A second characteristic of my resin composition becomes noticeable upon cure to form a coating. My composition gives a resin coating having initially a high gloss which it retains regardless of whether the coating enamel applied has been freshly prepared or subjected to prolonged storage prior to application.

For example, after four weeks of aging the enamel at room temperature, a hardness measurement was taken of a panel coated with the same 85% acrylic ester-15% hexamethylol melamine ether which panel had been cured to a hardness value of 28 as measured by the Sward rocker technique of hardness measurement. The panel coated with freshly prepared enamel and tested had initially high gloss and after the enamel had aged four weeks it also had about the same level of gloss. These results are tabulated in Table II below.

The degree of hardness which can be achieved in a white pigmented enamel composed of a 85/15 blend of a polyester resin and hexamethylol melamine ether resin with a titanium dioxide pigment and an 85/15 xylol/butanol solvent system may be illustrated by the following Table I which traces the degree of cure at test points of samples which are cured the same day the composition is made up (samples A 1, 2) to a period of almost 4 days later (samples B1 and B2). This data is as follows:

TABLE I.—$PCl_3$ CATALYST IN WHITE PIGMENTED ENAMEL

|   | Time of Initiation of Drying | Duration of Drying | Hardness |
|---|---|---|---|
| A | Day of catalyst addition | (1) Air-dried 4 days | 22 |
|   |   | (2) Air-dried 5 days | 32 |
| B | 4 days after catalyst addition | (1) Air-dried 2 days | 22 |
|   |   | (2) Air-dried 15 days | 34 |

These resins seem to cure to a high gloss finish and retain this finish for a prolonged period of time.

In any event, the sum total of all of these defects was that up to the time of the discovery which constitutes the present invention a user had the choice of using a high-temperature-cure catalyst, or a low-temperature-highly-unstable-short-pot-life type catalyst such as hydrochloric acid. As a result prior to my invention the field of low-temperature curable resinous coating compositions was stifled and handicapped for lack of a reliable, easily packaged and handled, stable low temperature curable resin composition. It was this condition which acted as the stimulus to the discovery which constitutes the present invention.

DESCRIPTION OF THE INVENTION

Accordingly, my invention comprises a new and novel resinous coating composition which not only overcomes the problems faced by those working with the materials of the prior art, but gives to the industry a totally new concept of catalysis of coating resins. The key to my discovery exists in the finding that one particular compound, namely the material phosphorus trichloride, is a low-temperature catalyst for any resin having at least a few available hydroxy groups and at the same time is indefinitely stable at room temperature in aromatic hydrocarbons such as xylene and when subsequently employed to perform as a latent catalyst does not go into operation until the coating formulation containing the same is exposed to atmospheric conditions in the form of a thin film.

While in the state of a liquid composition in the containing vessel prior to application and cure the novel curing catalyst is maintained quite inactive in an aromatic The enamel formulation employed in the above table is a polyester-substantially fully etherified hexamethylol melamine blend of resins in 85 parts of the former to 15 parts of the latter to which has been added a large amount of $TiO_2$ pigment and 0.7% by weight based on total resin solids of my novel catalyst $PCl_3$.

From the above data, it can easily be seen that the polyester resin formulation is still quite effective after 4 days or more on the shelf. Even longer times of up to 1 month or more have been found as stable.

These etherified methylol melamines are not considered to be resinous materials since they are, as individual entities, pure compounds, but they are potential resin-forming compounds which enter into chemical reaction with hydroxyl containing non-gelled polymeric materials. The concept of the degree of methylation or, more broadly, alkylation on the average, will be discussed here in order that this concept may be fully understood.

Theoretically, it is possible to methylolate melamine fully, that is, to produce hexamethylol melamine. However, frequently a composition purporting to be hexamethylol malamine, when analyzed shows a fractional degree of methylolation. It is well recognized that fractional methylolation is not considered to be possible. As a consequence, when a composition containing on analysis a degree of methylolation of 5.75, 5.80 or even 5.90, it has to be recognized that this is but an average degree of the methylolation of the melamine compound and establishes logically that the aforementioned methylol composition is composed of a mixture of a preponderant amount of hexamethylol melamine with comparatively minor amounts of pentamethylol melamine and perhaps insignificant amounts including traces of such derivatives as tetramethylol melamine and even trimethylol melamine.

The same concept of averages is also applicable to the alkylation or etherification of the hexamethylol melamine composition. There cannot be, based on present reasoning, a fractional alkylation and, as a consequence, when on analysis, a given composition shows that the degree of methylation is 2.5 and the degree of ethylation is correspondingly about 3.5, it must be concluded that there is present in such a composition some dimethyl ether tetraethyl ether of hexamethylol melamine as well as some trimethyl ether, triethyl ether of hexamethylol melamine. There may be present additionally some monoethyl ether, pentamethyl ether of hexamethylol melamine or even some tetramethyl ether diethyl ether of hexamethylol melamine. As a consequence, any one of the following compounds may be employed in varying amounts depending on the degree of methylation and the degree of different alkylation. Included in that group of compounds are the following: pentamethyl monoethyl ethers of hexamethylol melamine, tetramethyl, diethyl ethers of hexamethylol melamine, trimethyl triethyl ethers of hexamethylol melamine, dimethyl tetraethyl ethers of hexamethylol melamine, monomethyl, pentaethyl ethers of hexamethylol melamine and the hexaethyl ethers of hexamethylol melamine. When propanols, including normal propanol as well as isopropanol, are used as the alkylating material, the following ethers may be present in the system or mixture; pentamethyl monopropyl ethers of hexamethylol melamine, tetramethyl, dipropyl ethers of hexamethylol melamine, trimethyl tripropyl ethers of hexamethylol melamine, dimethyl tetrapropyl ethers of hexamethylol melamine, monomethyl, pentapropyl ethers of hexamethylol melamine, and hexapropyl ethers of hexamethylol melamine. When the butanols are used, including normal butanol, isobutanol and tertiary butanol, as the alkylating material, the blend of etherified hexamethylol melamines may include some or all of the following derivatives depending on the degree of methylation and the degree of butylation: pentamethyl monobutyl ethers of hexamethylol melamine, tetramethyl, dibutyl ethers of hexamethylol melamine, trimethyl tributyl ethers of hexamethylol melamine, dimethyl tetrabutyl ethers of hexamethylol melamine, monomethyl, pentabutyl ethers of hexamethylol melamine and the hexabutyl ethers of hexamethylol melamine. In addition to dihetero alkylation of the hexamethylol melamine, one could prepare and utilize trihetero alkylated hexamethylol melamines and tetrahetero alkylated hexamethylol melamines, if desired, but the process for preparing such a trihetero alkylated or a tetrahetero alkylated material would present processing complications, and it has not been found that any advantage is to be gained by using such trihetero alkylated and tetrahetero alkylated materials.

The amount of the substantially fully etherified hexamethylol melamines used in the composition of the present invention will vary between about 5% and about 40%, by weight, based on the total weight of said etherified hexamethylol melamines and hydroxyl containing non-gelled polymeric material. Correspondingly, in the composition there will be from about 95% to about 60%, by weight, of the hydroxyl containing non-gelled polymeric material which is reactive with said etherified hexamethylol melamines in the presence of $PCl_3$ catalyst based on the total weight of said polymeric material and said mixture of the etherified hexamethylol melamines. It should be apparent that all of the above percentages, by weight, will total 100%, by weight, and are based on the total solids weight of the melamine compounds and said polymeric material.

The resin component of my composition is a hydroxyl function containing non-gelled polymeric material selected from epoxy resins, vinyl and acrylic resins or copolymers thereof and polyester alkyd resins primarily.

When the polyester resins are used, they are prepared by reacting a polycarboxylic acid and anhydrides thereof including dicarboxylic acids either alone or in combination with various mono-carboxylic acids with a polyhydric alcohol, including the glycols, triols, etc. The polycarboxylic or mono-carboxylic acids may be either saturated, or unsaturated. The polyester resin is usually prepared by using a preponderance of alcoholic hydroxyl groups, the ingredients forming the polyester are permitted to react until a hydroxyl number of not less than about 35–40 is reached and, preferably, between about 50 and 150.

The vinyl or acrylic polymeric materials containing alcoholic hydroxyl groups are prepared by using a polymerizable vinyl or acrylic monomer which contains an alcoholic hydroxyl and is to be found in such compounds as the hydroxy alkyl esters of $\alpha,\beta$-unsaturated monocarboxylic acids such as the hydroxy alkyl esters of acrylic acid, methacrylic, ethacrylic and chloro as well as the other choloro substituted acrylic acids. These esters may either have a primary or a secondary hydroxyl group. Illustrative of the types of compounds that are used to make the copolymers in the anionic, polymeric material are 2-hydroxy-ethyl acrylate,
2-hydroxy-propyl acrylate,
3-hydroxy-propyl acrylate,
2-hydroxy-butyl acrylate,
3-hydroxy-butyl acrylate,
4-hydroxy-butyl acrylate,
8-hydroxy-octyl acrylate,
2-hydroxy-ethyl methacrylate,
5-hydroxy-hexylmethacrylate,
6-hydroxy-octylmethacrylate,
8-hydroxy-octylmethacrylate,
10-hydroxy-decylmethacrylate,
3-hydroxy-propylcrotonate,
4-hydroxy-amyl crotonate,
5-hydroxy-amyl crotonate,
6-hydroxy-hexyl crotonate,
7-hydroxy-heptyl crotonate,
10-hydroxy-decyl crotonate, and the like. These hydroxy esters may be used either singly or in combination with one another with other polymerizable vinyl monomers devoid of any alcoholic hydroxyl group including those set forth hereinabove in the discussion of the carboxyl group-containing monomers. Additionally, one can make use of other hydroxyl-containing polymerizable vinyl monomers such as methylolacrylamide, methylolmethacrylamide, and the like.

Additionally, one can make use of epoxy resins which contain a plurality of hydroxyl groups. A typical well-known commercial epoxy resin is Shell Chemical resin Epon 1007 as described in Shell Technical Bulletin, SC62–131 of August, 1962.

The polyepoxide-containing compositions which can be cured using my novel catalyst comprise organic materials having a plurality of reactive hydroxyl groups. These polyepoxide materials can be saturated or unsaturated, aliphatic, cycloaliphatic, aromatic or hetero-cyclic, and they may be substituted if desired with other substituents, besides the hydroxyl groups, with such as ether radicals, halogen atoms, and the like.

A widely used class of polyepoxides which can be catalyzed according to the practice of the present invention encompasses the resinous epoxy polyethers obtained by reacting an epihalohydrin, such as epichlorohydrin, epibromohydrin, epiiodihydrin, and the like, with either a polyhydric phenol or a polyhydric alcohol.

Among the polyhydric phenols which can be used in preparing these resinous epoxy polyethers are dihydric phenols represented by the general formula:

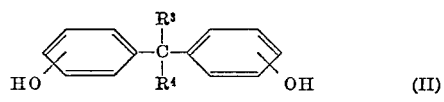

(II)

wherein the phenolic hydroxy groups may be in one of the 2,2'; 2,3'; 2,4'; 3,3'; 3,4'; or 4,4' positions on the aromatic nuclei, and each of $R^3$ and $R^4$ represent hydrogen, an alkyl group, such as methyl, ethyl, propyl, isopropyl, butyl, sec-butyl, tert-butyl, pentyl, isopentyl, hexyl, isohexyl, and the like; a cyclo(lower)-alkyl group, such as a cyclohexyl or substituted cyclohexyl group, e.g., methyl-, ethyl-, propyl-, butyl-, pentyl- and hexyl-substituted cyclohexyl, or an aromatic group, such as phenyl, tolyl, xylyl, and the like. In addition, the phenolic rings may have other substituents besides the hydroxyl group, for example, lower alkyl groups containing from 1 to 4 carbon atoms, i.e., methyl, ethyl, propyl, isopropyl, butyl, sec-butyl and tert-butyl groups, halogen atoms, i.e., fluorine, chlorine, bromine or iodine, and the like.

An illustrative but, by no means exhaustive listing of dihydric phenols falling within this general formula includes 4,4'-dihydroxydiphenyldimethylmethane (bis-phenol A),
2,4'-dihydroxydiphenylethylmethane,
3,3'-dihydroxydiphenyldiethylmethane,
3,4-dihydroxydiphenylmethylpropylmethane,
2,3'-dihydroxydiphenylethylphenylmethane,
4,4-dihydroxydiphenylpropylphenylmethane,
4,4'-dihydroxydiphenylbutylphenylmethane,
2,2'-dihydroxydiphenylditolylmethane,
4,4'-dihydroxydiphenyltolylmethylmethane, and the like.

Other polyhydric phenols which may also be co-reacted with an epihalohydric to provide these resinous epoxy polyethers are such compounds as resorcinol, hydroquinone, substituted hydroquinones, e.g., p-tert-butylhydroquinone, and the like, indanols such as those disclosed in U.S. Patent 2,754,285 to Petropoulos, and polyhydric phenols having two hydroxyl aryl groups separated by an aliphatic chain of at least six carbon atoms in length, said chain being attached by carbon-to-carbon bonding to nuclear carbon atoms of the hydroxyaryl groups. Members of this latter class of polyhydric phenols can be conveniently obtained by condensing phenol substituted with an aliphatic side chain having one or more olefinic double bonds positioned therein, thus providing the required number of separating atoms between the two hydroxy-phenyl groups of the resulting polyhydric phenol. Cardanol, obtainable in known manner from cashew nut shell liquid, is a convenient source of phenols containing such side chains.

Among the polyhydric alcohols which can be co-reacted with an epihalohydrin to provide these resinous epoxy polyethers are such compounds as ethylene glycol, propylene glycols, butylene glycols, pentane diols, bis-(4 - hydroxycyclohexyl)dimethylmethane, 1,4-dimethylolbenzene, glycerol, 1,2,6-hexanetriol, trimethylol propane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyvinyl alcohol, polyhydric thioethers such as 2,2'-dihydroxydiethyl sulfide, 2,2', 3,3'-tetrahydroxydipropyl sulfide and the like, mercapto alcohols such as α-monothioglycerol, α,α'-dithioglycerol, and the like, polyhydric alcohol partial esters such as monostearin, pentaerythritol monoacetate and the like, and halogenated polyhydric alcohols such as the monochlorohydrins of glycerol, sorbitol, pentaerythritol and the like.

When preparing these resinous epoxy polyethers from an epihalohydrin and a polyhydric phenol, the reaction will preferably be carried out in the presence of an amount of an alkaline material, e.g., sodium hydroxide or potassium hydroxide, sufficient to combine with the halogen released by the epihalohydrin during the course of the reaction. The amount of epihalohydrin used is generally in excess of the stoichiometric quantity required for reaction with the epihalohydrin. In addition, the reaction will preferably be carried out at a temperature ranging from about 50° C. to about 150° C., usually for periods of time ranging up to several hours.

When reacting an epihalohydrin with a polyhydric alcohol, the reaction is preferably carried out in the presence of an acid-acting material, e.g., hydrofluoric acid or a boron trifluoride-ether complex, and the resulting halohydrin product is then dehydrohalogenated in the presence of an alkaline material.

The following examples serve to illustrate the inventive aspects of my invention with respect to concept and mode of practice. Most of the examples set forth describe the formulation of coating compositions containing my novel curing agent and then go on to show an evaluation of those compositions as compared with the prior art compositions paying particular attention to the unexpected improvement in stability and gloss characteristics obtained by the use of my improved formulation. In all of the several examples the quantities of reactants and reaction products are expressed in parts by weight unless otherwise designated. In some instances the preparation of the base resin is briefly described such as the preparation of the acrylic terpolymer which is employed in Examples 1-4. In the case of Examples 5 and 6 the polyepoxide resin component is so well known that it is merely referred to by its commercial designation. Example 7 pertaining to the polyester is likewise treated without a great deal of detail being given as to the specific polyester employed.

These following examples are only intended to more concretely demonstrate the nature and function of my invention and not to limit the concept upon which they are based. For a legal definition of the invention, attention is directed to the several claims appended thereto.

EXAMPLES 1-4

(A) Acrylic terpolymer preparation

One hundred parts of a 1:1 mixture of xylene and Cellosolve acetate was charged to the reaction vessel and heated to reflux. A slow nitrogen sprage stream was used throughout the reaction. One per cent of di-t-butyl peroxide (base on monomer) was dissolved in a monomer mixture of 48.5 parts of styrene, 29.3 parts of butylacrylate and 22.2 parts of hydroxypropyl methacrylate. The catalyst-monomer mixture was added dropwise over a two-hour period to the refluxing solvent. The reaction mixture was then held at the reflux temperature (140° C.) for an additional 3½ hours. The resin solids of the final product was 50%.

(B) Enamel preparation

Four $TiO_2$ pigmented enamels were prepared with this acrylic resin base using a Pigment/Resin ratio of 90 parts of former/100 parts of latter, an acrylic resin solids/hexakis(methoxymethyl)melamine solids of 85/15, and final solids adjusted to 59.5%. The four enamels had the following compositions:

| Component | Example | | | |
|---|---|---|---|---|
| | 1 | 2 | 3 | 4 |
| $TiO_2$ | 51 | 51 | 51 | 51 |
| Acrylic solids | 48 | 48 | 48 | 48 |
| Hexakis (methoxy methyl)-melamine | 8.5 | 8.5 | 8.5 | 8.5 |
| Xylene | 41.6 | 34.3 | 27.0 | 27.0 |
| Cellosolve acetate | 24.0 | 24.0 | 24.0 | 24.0 |
| Butanol | 7.3 | 14.6 | 21.9 | 21.9 |
| $PCl_3$ (100%) | 0.34 | 0.34 | 0.34 | |
| HCl (100%) | | | | 0.34 |

(C) Evaluation and comparison of coating samples

The above enamels prepared in the manners of Examples 1-4 were subjected to comparative evaluation particularly with respect to hardness and gloss properties with the following results as indicated in Table II.

TABLE II

| Enamel | Catalyst (4% on amino) | Percent Butanol in Solvent | 20° Gloss of Films After Enamel has Aged— | | | | | |
|---|---|---|---|---|---|---|---|---|
| | | | Initial | 1 day | 2 days | 3 days | 4 days | 4 weeks |
| 1 | PCl₃ | 10 | 81 | 84 | 79 | 82 | 80 | 81 |
| 2 | PCl₃ | 20 | 84 | 82 | 88 | 85 | 84 | 89 |
| 3 | PCl₃ | 30 | 82 | 82 | 77 | 85 | 83 | ---- |
| 4 | HCl | 30 | 42 | 25 | 15 | 16 | 15 | 14 |

| Enamel | Catalyst (4% on amino) | Percent Butanol in Solvent | Sward Hardness of Film After it has Aged for 4 Hours | | | | | |
|---|---|---|---|---|---|---|---|---|
| | | | Initial Enamel | 1 day old Enamel | 2 day old Enamel | 3 day old Enamel | 4 day old Enamel | 4 wks. old Enamel |
| 1 | PCl₃ | 10 | 32 | 26 | 34 | 24 | 26 | 28 |
| 4 | HCl | 30 | 30 | 26 | 26 | 24 | 24 | 18 |

EXAMPLES 5 AND 6

(A) Pigmented polyepoxide resin-based enamel preparation

Two titanium dioxide pigmented enamel samples were prepared using as the hydroxy group containing resinous component a polyepoxide resin specifically EPON®–1007 which is the trade name for a polyepoxide product manufactured by the Shell Chemical Company and reported in their Technical Bulletin SC:62–131 of August 1962. This polyepoxide resin has a melting point of from 125° to 135° C., a viscosity of 18 to 28 poises at 25° C. and an epoxide equivalent of 2,000 to 2,500. These constants are taken on a 40% by weight solution of the resin in butyl carbitol at 25° C. The second component of the resinous blend was an amino cross-linking agent, hexakis(methoxymethyl)melamine wherein the blend ratio was 85 parts by weight of polyepoxide resin to 15 parts by total weight of the amino cross-linking agent. The ratio of the pigment to the resinous binder was 90 parts of the pigment to 100 parts of the binder. Simultaneously blended into this formulation was in Example 5, 0.34 part of my novel curing agent and for comparison purposes 0.35 part of the prior art agent hydrochloric acid. The final solids of the enamel were adjusted to 60% and the enamels therefore had the following compositions. The specific compositions of these two materials are set forth as Examples 5 and 6 below.

(B) Evaluation and comparison of coating samples

The above enamels prepared in the manners indicated for Examples 5 and 6 were subjected to comparative evaluation particularly with respect to hardness and gloss with the following results as indicated in Table III.

| Component | Example | |
|---|---|---|
| | 5 | 6 |
| TiO₂ | 51 | 51 |
| Polyepoxide resin | 48 | 48 |
| Hexakis(methoxymethyl)melamine | 8.5 | 8.5 |
| Xylene | 33.5 | 33.5 |
| Cellosolve acetate | 33.0 | 33.0 |
| Butanol | 6.5 | 6.5 |
| PCl₃ (100%) | 0.34 | ---- |
| HCl (100%) | ---- | ---- |

EXAMPLES 7 AND 8

(A) Polyester resin based enamel preparation

Two unpigmented enamel samples were prepared using as the hydroxy group containing resinous component a polyester reaction product of 1 mole of phthalic anhydride, 1.1 mole of glycerine and 0.5 mole of coconut oil fatty acid. The second component of the resinous blend was an aminotriazine cross-linking agent hexakis(methoxymethyl)melamine wherein the blend ratio was 60 parts by weight of polyester resin to 40 parts by total weight of the aminotriazine cross-linking agent. Simultaneously blended into this formulation was in Example 7, 1.7 percent by weight of total resin solids my novel PCl₃, curing agent and for comparison purposes 1.7 percent by weight of total resin solids of the prior art catalyst hydrochloric acid. The final solids of the enamels were adjusted to 56% and had the following compositions:

| Component | Example | |
|---|---|---|
| | 7 | 8 |
| Polyester resin | 60 | 60 |
| Hexakis(methoxymethyl)melamine | 40 | 40 |
| Xylene/ethanol | 70/30 | 70/30 |
| PCl₃ (percent based on total resin) | 1.7 | ---- |
| HCl (percent based on total resin) | ---- | 1.7 |

(B) Evaluation and comparison of coating samples

The above enamels prepared in the manners indicated for the above formulations of Examples 7 and 8 were subjected to comparative evaluation particularly with respect to viscosity as an index of shelf stability and reactivity of a coated film as measured by the "tack free time." These values are set forth in tabulated form in Table IV below:

TABLE IV

| Enamel | Catalyst | Percent Ethanol in Solvent | Room Temperature Viscosity After Ageing | | | Tack Free Time of Film After Sample Ageing | | |
|---|---|---|---|---|---|---|---|---|
| | | | 17 days | 22 days | 56 days | Initial | 11 days | 50 days |
| 1 | 1.7% PCl₃ | 33 | 80 | 200 | (¹) | 50 min | 140 min | 180 |
| 2 | 1.7% HCl | 30 | 225 | (¹) | (¹) | 40 min | 60 min | (²) |

¹ Gel.
² Hard.

As seen from the above data the PCl₃ samples are outstanding in their ability to remain unreacted for protracted periods.

EXAMPLE 9

A titanium dioxide pigmented enamel was prepared from the previously described acrylic resin of Example 1 and a methylated ethylated hexamethylolmelamine. The molar composition was melamine/1 mole, formal-

TABLE III

| Enamel | Catalyst 0.6% on Resin Solids | Percent Butanol in Solvent | 20° Gloss of Films After Enamel has aged— | | | Sward Hardness of Film After it has Aged for 4 Hours | | |
|---|---|---|---|---|---|---|---|---|
| | | | Initial | 3 days | 14 days | Initial Enamel | 4 day old Enamel | 14 day old Enamel |
| 1 | PCl₃ | 9.3 | 80 | 78 | 79 | 40 | 36 | 34 |
| 2 | HCl | 9.3 | 48 | 20 | 15 | 38 | 30 | 28 | dehyde/6 moles, methanol/3.1 moles, ethanol/2.5 moles. The ratio of titanium dioxide pigment to resin was 90/100 and the ratio of acrylic resin to amino cross-linking agent was 85 parts of the former to 15 parts of the latter. The final solids was adjusted to 60%. The $PCl_3$ catalyst charge was 4% by weight based on the amount of amino cross-linking agent. The initial 20° gloss of films from this enamel was 79. Films prepared after the enamel had aged three weeks had a 20° gloss reading of 78. After 4 hours, a Sward hardness value of 30 was obtained from freshly prepared enamels, and a value of 26 from enamels that had been aged three weeks.

I claim:

1. A stable, high gloss imparting low temperature curable coating composition which comprises a resinous component (A) of from about 95 to 60% by weight of:
   (1) a curable resinous component which consists of a free hydroxyl function containing resin selected from the group consisting of vinyl resins, polyester resins and polyepoxide resins, and from 5 to 40% by weight of
   (2) a cross-linking agent composed of a substantially fully etherified hexamethylol melamine and
(B) as a curing agent component from 0.5 to 6% by weight based on the total resin solids of the latent curing catalyst phosphorus trichloride.

2. A composition according to claim 1 wherein the cross-linking agent (2) is a hexakismethoxymethyl melamine.

3. A composition according to claim 1 wherein the cross-linking agent (2) is a pentakismethoxymethyl melamine.

4. A composition according to claim 1 wherein the free hydroxyl function containing resin is an acrylic resin.

5. A composition according to claim 4 wherein the free hydroxyl function containing acrylic resin is a copolymer of butylacrylate and hydroxypropyl methacrylate.

6. A composition according to claim 1 wherein the free hydroxyl function containing resin is a polyepoxide resin having a plurality of reactive hydroxyl groups.

7. A composition according to claim 5 wherein the cross-linking agent is a hexakismethoxymethyl melamine.

8. A composition according to claim 6 wherein the cross-linking agent is a hexakismethoxymethyl melamine.

9. A composition according to claim 1 wherein the free hydroxyl function containing resin is a polyester resin.

10. A composition according to claim 9 wherein the cross-linking agent is a hexakismethoxymethyl melamine.

References Cited

UNITED STATES PATENTS

| | | | |
|---|---|---|---|
| 2,754,285 | 7/1956 | Petropoulos | 260—834 |
| 2,851,429 | 9/1958 | Petropoulos | 260—850 |
| 3,082,184 | 3/1963 | Falgiatore et al. | 260—851 |
| 3,113,117 | 12/1963 | Gosselink et al. | 260—21 |

FOREIGN PATENTS 226,874  2/1960  Australia.

OTHER REFERENCES

Chem. Abstracts, vol. 59, No. 2, July 22, 1963, p. P1808F.

Chem. Abstracts, vol. 56, No. 5, Mar. 5, 1962, p. P4978F.

Chem. Abstracts, vol. 61, No. 4, Aug. 17, 1964, p. P4595g.

Chem. Abstracts, vol. 63, No. 13, Dec. 20, 1965, p. P18380c.

DONALD E. CZAJA, *Primary Examiner.*

R. W. GRIFFIN, *Assistant Examiner.*

UNITED STATES PATENT OFFICE
CERTIFICATE OF CORRECTION

Patent No. 3,412,055                                                     November 19, 1968

Jerry Norman Koral

It is certified that error appears in the above identified patent and that said Letters Patent are hereby corrected as shown below:

Column 4, line 63, "malamine" should read -- melamine --. Column 7, line 22, "3,4-" should read -- 3,4'- --; line 24, "4,4-" should read -- 4,4'- --.

Signed and sealed this 10th day of March 1970.

(SEAL)
Attest:

Edward M. Fletcher, Jr.                                   WILLIAM E. SCHUYLER, JR.
Attesting Officer                                                 Commissioner of Patents